United States Patent [19]

Tanaka et al.

[11] Patent Number: 5,695,838
[45] Date of Patent: Dec. 9, 1997

[54] ADHESIVE POLYPROPYLENE RESIN COMPOSITION AND MULTI-LAYER LAMINATE BODY USING THE RESIN COMPOSITION

[75] Inventors: Haruhiko Tanaka; Hideshi Kawachi, both of Ichihara, Japan

[73] Assignee: Mitsui Petrochemical Industries, Ltd., Tokyo, Japan

[21] Appl. No.: 698,424

[22] Filed: Aug. 15, 1996

[30] Foreign Application Priority Data

Aug. 15, 1995 [JP] Japan .................................. 7-207936

[51] Int. Cl.⁶ .................................................. B32B 1/08
[52] U.S. Cl. .................. 428/35.2; 428/34.3; 428/475.8; 428/476.1; 428/476.3; 428/476.9; 428/515; 428/516; 428/523; 428/910; 525/240; 525/71; 525/74; 525/78; 525/285; 525/298; 525/301; 525/302
[58] Field of Search ................ 525/240, 71, 74, 525/78, 80, 285, 298, 301, 302; 428/475.8, 476.1, 476.3, 476.9, 515, 516, 523, 910, 34.1, 34.3, 35.2

[56] References Cited

U.S. PATENT DOCUMENTS

| 4,481,262 | 11/1984 | Shida et al. | 428/441 |
| 4,716,061 | 12/1987 | Winter | 428/35 |
| 4,724,185 | 2/1988 | Shah | 428/339 |
| 5,367,022 | 11/1994 | Kiang et al. | 525/74 |

*Primary Examiner*—Edith Buffalow
*Attorney, Agent, or Firm*—Birch, Stewart, Kolasch & Birch, LLP

[57] ABSTRACT

Disclosed are (1) an adhesive polypropylene resin composition comprising (a) 50 to 90 parts by weight of a modified polypropylene or a composition containing said modified polypropylene, said modified polypropylene being graft-modified with at least one monomer selected from the group consisting of an unsaturated carboxylic acid from the group consisting of an unsaturated carboxylic acid and a derivative thereof and (b) 10 to 50 parts by weight of a modified polyolefin other than the modified polypropylene or the composition (a), said modified polyolefin being grafted with at least one monomer selected from the group consisting of an unsaturated carboxylic acid and a derivative thereof, and (2) a multi layer laminate body comprising (i) a layer of a polyolefin (ii) a layer of the above-said adhesive polypropylene resin composition and (iii) a layer of a polyamide resin and/or an ethylene/vinyl alcohol copolymer, said layers being laminated in the order of (i), (ii) and (iii). The composition of (1) has an excellent adhesion capability for a polyolefin resin layer such as polypropylene layer and also a layer of polyamide resin and/or an ethylene/vinyl alcohol copolymer resin layers.

16 Claims, No Drawings

ADHESIVE POLYPROPYLENE RESIN COMPOSITION AND MULTI-LAYER LAMINATE BODY USING THE RESIN COMPOSITION

BACKGROUND OF THE INVENTION

1. (Field of the Invention)

The present invention relates to an adhesive polypropylene resin composition and to a multi-layer laminate body using the composition.

More specifically, the invention relates to an adhesive polypropylene resin composition suited for adhering together a polyolefin layer such as a polypropylene layer and a layer of a polyamide resin and/or an ethylene/vinyl alcohol copolymer, and to a multi-layer laminate body using the above composition as an adhesive layer.

2. (Description of the Prior Art)

There have heretofore been known a laminate film of a polyolefin such as polypropylene and a polyamide resin, a laminate film of a polyolefin such as a polypropylene and an ethylene/vinyl alcohol copolymer, and a variety of materials have heretofore been proposed for use as the adhesion layers.

However, these materials lose adhering force to a large extent in the drawing step for producing a shrink film, and do not necessarily offer adhering force to a satisfactory degree.

SUMMARY OF THE INVENTION

The object of the present invention is to provide an adhesive polypropylene resin composition which exhibits excellent adhering force for the polyolefin such as polypropylene and a polyamide resin and/or an ethylene/vinyl alcohol copolymer.

Another object of the present invention is to provide a multi-layer laminate body having an adhesion layer composed of the above-mentioned adhesive polypropylene resin composition of the present invention between the polyolefin layer and the polyamide resin layer and/or the ethylene/vinyl alcohol copolymer layer.

A further object of the present invention is to provide a multi-layer laminate body having an adhesion layer composed of the above-mentioned adhesive polypropylene resin composition of the present invention which exhibits excellent adhering force in both an undrawn state and a drawn state.

According to the present invention, there is provided an adhesive polypropylene resin composition comprising:

(a) 50 to 90 parts by weight of a modified polypropylene or a composition containing said modified polypropylene, said modified polypropylene being graft-modified with at least one monomer selected from the group consisting of an unsaturated carboxylic acid and a derivative thereof; and (b) 10 to 50 parts by weight of a modified polyolefin other than the modified polypropylene (a), said modified polyolefin being grafted with at least one monomer selected from the group consisting of an unsaturated carboxylic acid and a derivative thereof.

According to the present invention, furthermore, there is provided a multi-layer laminate body having not less than three layers in which a polyolefin layer, an adhesion layer comprising said adhesive polypropylene resin composition and a layer of a polyamide resin and/or an ethylene/vinyl alcohol copolymer are laminated in this order.

PREFERRED EMBODIMENT OF THE INVENTION

In the adhesive polypropylene resin composition of the present invention, the polypropylene which is a base polymer of the modified polypropylene resin (a) is a propylene homopolymer having a melting point of higher than 130° C. and of not higher than 170° C. or a copolymer of a propylene containing not less than 93 mol % of propylene and another α-olefin.

When a copolymer is used, as the other α-Olefin co-monomer, there can be used ethylene, 1-butene, 1-hexene, 4-methyl-1-pentene, 1-octene or 1-decene.

The polypropylene or the copolymer has a melt flow rate (as measured at 230° C. in compliance with ASTM D1238) of, preferably, from 0.1 to 100 g/10 minutes and, more preferably, from 0.5 to 50 g/10 minutes.

As the monomer for grafting (hereinafter referred to as "grafting monomer"), there can be used an unsaturated carboxylic acid or a derivative thereof. As the unsaturated carboxylic acid, there can be concretely exemplified acrylic acid, methacrylic acid, maleic acid, fumaric acid, and itaconic acid. As the derivative of the unsaturated carboxylic acid, there can be exemplified acid anhydride, ester, amide, imide and metal salt. Concrete examples include maleic anhydride, 5-norbornane-2,3-dicarboxylic acid anhydride, itaconic anhydride, citraconic anhydride, methyl acrylate, methyl methacrylate, ethyl acrylate, ethyl methacrylate, glycidyl acrylate, monoethyl maleate ester, diethyl maleate ester, monomethyl fumarate ester, dimethyl fumarate ester, monomethyl itaconate ester, diethyl itaconate ester, acrylamide, methacrylamide, monoamide maleate, diamide maleate, N-monoethylamide maleate, N,N-diethylamide maleate, N-monobutylamide maleate, N,N-dibutylamide maleate, monoamide fumarate, diamide fumarate, N-monobutylamide fumarate, N,N-dibutylamide fumarate, maleimide, N-butylmaleimide, N-phenylmaleimide sodium acrylate, sodium methacrylate, potassium acrylate and potassium methacrylate. Among these grafted monomers, it is most desired to use maleic anhydride or 5-norbornane-2,3-dicarboxylic acid anhydride.

The preferable modified polypropylene modified with an unsaturated carboxylic acid or a derivative thereof is the one which is graft-modified with the unsaturated carboxylic acid or the derivative thereof in an amount of from 0.05 to 15% by weight and, more preferably, from 0.1 to 10% by weight based on the polypropylene of before being modified. The component of the present invention may be composed of the graft-modified polypropylene alone or may be a composition of the unmodified polypropylene and the graft-modified polypropylene.

The modified polyolefin (b) is a graft-modified polyolefin using, as base resins, polyethylene, polybutene, ethylene/α-olefin copolymer (but excluding ethylene-propylene copolymer having an ethylene content of not larger than 7 mol %), etc., and graft-modified with an unsaturated carboxylic acid or a derivative thereof and, preferably, (i) has a density of from 0.860 to 0.930 g/cm$^3$ and, more preferably, from 0.860 to 0.905 g/cm$^3$, (ii) has a melt flow rate (MFR) at 190° C. under a load of 2.16 kg of from 0.1 to 50 g/10 minutes and, more preferably, from 0.1 to 10 g/10 minutes, and (iii) has a grafting ratio of from 0.01 to 5% by weight and, preferably, from 0.3 to 3% by weight.

More preferably, the modified polyolefin uses substantially amorphous or low-crystalline ethylene/α-olefin copolymer as a base resin.

Preferably, the base polymer of the modified ethylene/α-olefin copolymer (b) is a random copolymer of ethylene and α-olefin having 3 to 20 carbon atoms. A preferred α-olefin has 3 to 10 carbon atoms. Preferred examples of the α-olefin include propylene, 1-butene, 1-hexene, 4-methyl-1-pentene, 1-octene, 1-decene, etc.

The ethylene/α-olefin copolymer (b) can be prepared by a widely known method by using a catalyst of the type of titanium (Ti), vanadium (V) or zirconium (Zr).

Preferably, the ethylene/α-olefin copolymer (b) contains a polymer unit inherent in ethylene in an amount of from 95 to 70 mol % and, preferably, from 90 to 75 mol %.

The ethylene/α-olefin copolymer (b) is substantially amorphous or is crystalline to a small degree and has a crystallinity (as measured by an X-ray diffraction method) of preferably not larger than 40%.

A variety of known methods can be employed for preparing a modified product by graft-copolymerizing the polyolefin with the grafting monomer.

For instance, there can be exemplified a melt modification method in which the polyolefin is melted by using the extrusion machine and is graft-copolymerized by being added with the grafting monomer and a solution modification method in which the grafting monomer dissolved in a solvent is added to graft-copolymerize the polyolefin. In either case, it is desired to start the reaction in the presence of a radical initiator in order to efficiently graft-copolymerize the grafting monomer. The grafting reaction is usually carried out at a temperature of from 60° to 350° C. The radical initiator is used at a ratio of, usually, from 0.001 to 1 part by weight per 100 parts by weight of the polyolefin. As the radical initiator, there can be used organic peroxide, organic perester, such as benzoyl peroxide, dichlorobenzoyl peroxide, dicumyl peroxide, di-tert-butyl peroxide, 2,5-dimethyl-2,5-di(peroxide benzoate) hexyne-3,1,4-bis(tert-butylperoxyisopropyl) benzene, lauroyl peroxide, tert-butyl peracetate, 2,5-dimethy 1-2,5-di(tert-butylperoxy) hexyne-3,2,5-dimethyl-2,5-di(tert-butylperoxy) hexane, tert-butyl perbenzoate, tert-butyl perphenyl acetate, tert-butylperisobutylate, tert-butyl per-sec-octoate, tert-butyl perpivalate, cumyl perpivalate, tert-butyl perdiethyl acetate, or other azo compound such as azoisobutylonitrile or dimethylazoisobutylate, etc. Among them, it is desired to use a dialkyl peroxide such as dicumyl peroxide, di-tert-butyl peroxide, 2,5-dimethyl-2,5-di (peroxybenzoate) hexyne-3,2,5-dimethyl-2,5-di(tert-butylperoxy) hexane, or 1,4-bis(tert-butyl peroxyisopropyl) benzene. During the reaction, there may be made present other monomer such as styrene.

It is desired that the amount of the grafting monomer grafted to the polyolefin (hereinafter referred to as grafting ratio) is so adjusted that the grafting ratio of the entire composition is from $10^{-4}$ to 5% by weight. From an industrial point of view, it is desired to prepare a modified polyolefin having a grafting ratio of from $10^{-2}$ to 6% by weight in advance, and mix the modified polyolefin into the unmodified polyolefin to adjust the grafting ratio, since this method makes it possible to property adjust the amount of the grafting monomer in the composition. It is, however, also allowable to blend the polyolefin with a predetermined amount of the grafting monomer from the first time.

In the case of the polyethylene and the ethylene/α-olefin copolymer, either the melt modification method or the solution modification can be employed. In the case of the polypropylene, however, the solution modification method is desired from the standpoint of graft-reaction efficiency and suppressing the reduction in the molecular weight.

The component (a) is contained in an amount of from 50 to 90 parts by weight and, preferably, from 50 to 80 parts by weight, and the component (b) is contained in an amount of from 10 to 50 parts by weight and, preferably, from 20 to 50 parts by weight based on the total weight of these components.

It is desired that the composition of the present invention containing the components (a) and (b) has a melt flow rate (ASTM, D1238, 230° C.) of from 0.5 to 30 g/10 minutes and, preferably, from 1 to 10 g/10 minutes.

The adhesive polypropylene resin composition of the present invention exhibits excellent adhering force for the polyolefin resin such as polypropylene resin, for the polyamide resin and for the ethylene/vinyl alcohol copolymer.

Secondly, therefore, the present invention provides a multi-layer laminate body comprising a polyolefin layer such as of polypropylene, an adhesion layer and a layer of a polyamide resin and/or an ethylene/vinyl alcohol copolymer which are laminated in the order mentioned, the adhesion layer comprising the adhesive polypropylene resin composition of the present invention.

The multi-layer laminate body of the present invention has at least three layers, the first layer being a polyolefine layer (A), the second layer being an adhesion layer (B) and the third layer being the layer of a polyamide resin and/or an ethylene/vinyl alcohol copolymer (C). These layers may be laminated in the following combinations, i.e., A/B/C, A/B/C/B, A/B/C/B/A, etc.

The polyolefin layer which is the first layer may typically be a polypropylene resin layer. The polypropylene resin constituting this layer may be a homopolymer of propylene or a copolymer of a propylene having a propylene content of not smaller than 93 mol % and other α-olefin. The other α-olefin may be ethylene, 1-butene, 1-hexene, 4-methyl-1-pentene, 1-octene or 1-decene.

The adhesion layer which is the second layer in the multi-layer laminate body of the present invention comprises the above-mentioned adhesive polypropylene resin composition of the present invention.

The third layer in the multi-layer laminate body of the present invention comprises the polyamide resin and/or the ethylene/vinyl alcohol copolymer.

Preferred examples of the polyamide resin include nylon 6, nylon 66, nylon 610, nylon 12, nylon 11, MXD nylon, amorphous nylon, and terephthalic acid/adipic acid/hexamethylene diamine copolymer.

Preferably, furthermore, the ethylene/vinyl alcohol copolymer has an ethylene content of from 20 to 50 mol %.

The ethylene/vinyl alcohol copolymer is prepared by saponifying an ethylene/vinyl acetate copolymer.

The multi-layer laminate body of the present invention is produced by laminating the polypropylene layer, the adhesion layer and the layer of the polyamide resin and/or the ethylene/vinyl alcohol copolymer in a molten state.

The multi-layer laminate body can be produced by, for example, the co-extrusion molding, cast film molding, inflation film molding, tenter biaxial drawing method or tubular biaxial drawing method.

Usually, a shrink film is produced under the drawing conditions of a drawing temperature of from 70° to 130° C. and a drawing ratio (longitudinal×transverse) of 2×2 to 5×5, and the obtained film has a thickness of from 10 to 200 μm.

The multi-layer laminate body of the present invention may be used in an undrawn form after it is molded, or may be used by being drawn in at least the monoaxial direction or, preferably, in the biaxial directions after it is molded. When the third layer is the polyamide resin layer, it is desired that the multi-layer laminate body is used by being drawn. When the third layer is the ethylene/vinyl alcohol copolymer layer, the multi-layer laminate body may be used either without being drawn or by being drawn. The drawing imparts increased strength. When a high strength is needed, therefore, it is desired that the multi-layer laminate body is used by being drawn. When drawn, however, the adhesion layer usually exhibits a slightly decreased adhering force.

Even when the multi-layer laminate body of the present invention is drawn, the adhering force does not greatly decrease, and a sufficiently practicable adhering force is maintained. It is desired that the drawing is effected at a drawing ratio of from 1.5 to 6 times in the monoaxial direction. When drawn in the biaxial directions, it is desired that the drawing is effected at a drawing ratio of from 1.5 to 6 times.

When the multi-layer laminate body of the present invention is cast-molded by the T-die method, the molding is effected at a relatively high rate such as not smaller than 20 m/min. and, preferably, from 20 to 150 m/min., in order to obtain a multi-layer laminate body having a film strength and adhering force same as those of the above-mentioned drawn laminate body.

The multi-layer laminate body of the present invention exhibits excellent strength, heat resistance and gas barrier property. Besides, shrinking property can be imparted thereto, lending itself well suited for packaging meat such as hams, etc.

EXAMPLES

The invention will be described in further detail by way of Examples to which only, however, the invention is in no way limited.

In the present invention including the following Examples, the graft ratio in the graft-modified polypropylene (a) or in the graft-modified polyolefin (b) is a graft ratio obtained by measuring the absorbance at 1792 cm$^{-1}$ or 1860 cm$^{-1}$ and the absorbance at 4335 cm$^{-1}$ by using an infrared spectrophotometric apparatus, seeking (the measured absorbance at 1792 cm$^{-1}$ or 1680 cm$^{-1}$/the measured absorbance at 4335 cm$^{-1}$), and obtaining a calibration curve chart prepared from this ratio value.

(Example 1)

A propylene/ethylene random copolymer (r-PP, ethylene content of 3.6 mol %, melting point of 139° C., MFR (230° C.)=6 g/10 min.) in an amount of 85 parts by weight, a maleic anhydride graft-modified polypropylene (MAH-PP, grafted with 3% by weight of maleic anhydride, limiting viscosity [η] in a decalin solution at 135° C. of 0.4 dl/g, melting point of 160° C.) in an amount of 5 parts by weight, and a maleic anhydride graft-modified ethylene/butene copolymer (MAH-EBR, produced using a V-type catalyst, butene content of 10 mol %, grafted with 0.5% by weight of maleic anhydride, MFR (190° C.)=5 g/10 min., melting point of 70° C.) in an amount of 10 parts by weight, were mixed together using Henschel's mixer, and were melt-kneaded in a monoaxial extruder (heated at 230° C., special dulmadge screw), in order to obtain a modified polypropylene resin composition.

The adhesion strength of this composition to the ethylene/vinyl alcohol copolymer and to the polyamide resin were measured by a method described below.

(I) Method of Evaluating Adhesion Strength to an Ethylene/Vinyl Alcohol Copolymer.

By using an ethylene/vinyl alcohol copolymer (EVOH, trade name: EVAL EP-E105, produced by Kurare Co., EVAL is an ethylene/vinyl alcohol copolymer having an MFR of 5.5 g/10 min., ethylene content of 44 mol %), the above-mentioned modified polypropylene resin composition and the above-mentioned r-PP, a three-layer cast film was molded under the following conditions.

Film layer constitution:

EVOH (outer layer)/composition(intermediate layer)/r-PP=40/40/160 É

(II) A Method of Evaluating the Adhesion Strength to a Polyamide Resin:

Using the polyamide resin (PA; tradename AMILAN produced by Toray Co., Ltd. AMILAN is a polyamide resin (nylon 6)), the above modified polypropylene resin composition and the r-PP, a three-layer cast film was molded under the following conditions.

Film layer construction:

PA (outer layer)/composition (interlayer)/r-PP=40/40/160 µ

By using a biaxial extruder manufactured by Toyo Seiki Co., the thus obtained three-layer film of (I) and (II) were heated at 80° C. for 10 minutes, and were biaxially drawn simultaneously at this temperature into three times in the longitudinal direction and into three times in the transverse direction to prepare a three-layer drawn film. After cooled at room temperature, the adhesion strength at the interface between the EVOH layer or PA layer and the composition of the three-layer drawn films were found relying upon the T-type peeling at a peeling rate of 300 mm/min.

The results were as shown in Table 1.

(Examples 2 and 3)

In Example 1, the modified polypropylene resin composition was blended with the propylene/ethylene random copolymer (r-PP) in amounts of 75 parts by weight (Example 2) and 65 parts by weight (Example 3), and was blended with the maleic anhydride graft-modified ethylene/butene copolymer (MAH-EBR) in amounts of 20 parts by weight (Example 2) and 30 parts by weight (Example 3). In other respects, the procedure was carried out in the same manner as in Example 1 to prepare modified polypropylene resin compositions, and their adhesion strengths were evaluated by the same method as that of Example 1.

The results were as shown in Table 1.

(Example 4)

The procedure was carried out in the same manner as in Example 2 but using a maleic anhydride graft-modified ethylene/propylene copolymer (MAH-EPR, produced by using a V-type catalyst, propylene content of 20 mol %, grafted with 0.5% by weight of a maleic anhydride, MFR (190° C.) of 3 g/10 min., melting point of 40° C.) instead of the MAH-EBR used in Example 2.

The results were as shown in Table 1.

(Example 5)

The procedure was carried out in the same manner as in Example 2 but using a maleic anhydride graft-modified ethylene/octene copolymer (MAH-EOR, produced by using a Zr-type catalyst, octene content of 15 mol %, grafted with 0.5% by weight of a maleic anhydride, MFR (190° C.) of 3 g/10 min., melting point of 55° C.) instead of the MAH-EBR used in Example 2.

The results were as Shown in Table 1.

(Example 6)

The procedure was carried out in the same manner as in Example 3 but using a propylene homopolymer (h-PP, melting point of 165° C., MFR (230° C.)=6 g/10 min.) instead of r-PP used in Example 3.

The results were as shown in Table 1.

(Example 7)

The procedure was carried out in the same manner as in Example 3 but using 10 parts by weight of a maleic anhydride graft-modified polyethylene (MAH-PE, 0.92 g/cm³, produced by using a Ti-type catalyst, grafted with 1.0% by weight of a maleic anhydride, MFR (190° C.)=0.5 g/10 min., melting point of 122° C.) and 20 parts by weight of an unmodified ethylene/propylene copolymer (EPR, produced by using a V-type catalyst, propylene content of 20 mol %, MFR (190° C.) of 3 g/10 min., melting point of 40° C.) instead of 30 parts by weight of MAH-EBR used in Example 3.

The results were as shown in Table 1.

(Example 8)

The procedure was carried out in the same manner as in Example 3 but using 15 parts by weight of MAH-EBR used in Example 3 and using 15 parts by weight of EPR used in Example 7 instead of using 30 parts by weight of MAH-EBR used in Example 3.

The results were as shown in Table 1.

(Comparative Example 1)

The procedure was carried out in the same manner as in Example 1 using r-PP and MAH-PP used in Example 1 at a ratio shown in Table 2 but without using MAH-EBR.

The results were as shown in Table 2.

(Comparative Examples 2 and 3)

The procedure was carried out in the same manner as in Example 1 using r-PP and MAH-PP used in Example 1 in amounts (parts by weight) shown in Table 2, without using 10 parts by weight of MAH-EBR used in Example 1 but, instead, using EPR (unmodified ethylene/propylene copolymer) used in Example 7 in amounts of 20 parts by weight (Comparative Example 2) and 30 parts by weight (Comparative Example 3).

The results were as shown in Table 2.

TABLE 2

| | Parts by weight | Comparative Example 1 | Comparative Example 2 | Comparative Example 3 |
|---|---|---|---|---|
| r-PP | | 95 | 75 | 65 |
| h-PP | | — | — | — |
| MAH-PP | | 5 | 5 | 5 |
| MAH-PE | | — | — | — |
| MAH-EPR | | — | — | — |
| MAH-EBR | | — | — | — |
| MAH-EOR | | — | 20 | 30 |
| Adhering force | g/15 mm | | | |
| to EtOH layer | | 10 | 25 | 35 |
| to PA layer | | 30 | 40 | 60 |

What is claimed is:

1. An adhesive polypropylene resin composition comprising:

(a) 50 to 90 parts, by weight of the adhesive resin composition, of a modified polypropylene or a composition containing said modified polypropylene, said modified polypropylene being graft-modified with at least one monomer selected from the group consisting of an unsaturated carboxylic acid and an anhydride of a dibasic unsaturated carboxylic acid; and (b) 10 to 50 parts, by weight of the adhesive resin composition, of a graft-modified ethylene/α-olefin copolymer grafted with at least one monomer selected from the group consisting of an unsaturated carboxylic acid and an anhydride of a dibasic unsaturated carboxylic acid;

wherein said graft-modified ethylene/α-olefin copolymer (b) contains 70 to 95 mol % of ethylene as a constituent unit of the copolymer and has:

(i) a density of from 0.860 to 0.930 g/cm³, (ii) a melt flow rate, at 190° C. under a load of 2.16 kg, of from 0.1 to 50 g/10 min., and (iii) a grafting ratio based on a base copolymer of the modified copolymer (b) of from 0.01 to 5% by weight.

2. An adhesive polypropylene resin composition according to claim 1, wherein said modified ethylene/α-olefin copolymer (b) is an amorphous or a low-crytsalline copolymer having a crystallinity, as measured by an x-ray diffraction method, of not larger than 40%.

3. A multi-layer laminate body according to claim 1 wherein the laminate body is a film having a shrinking property.

TABLE 1

| | Parts by weight | Example 1 | Example 2 | Example 3 | Example 4 | Example 5 | Example 6 | Example 7 | Example 8 |
|---|---|---|---|---|---|---|---|---|---|
| r-PP | | 85 | 75 | 65 | 75 | 75 | — | 65 | 65 |
| h-PP | | — | — | — | — | — | 65 | — | — |
| MAH-PP | | 5 | 5 | 5 | 5 | 5 | 5 | 5 | 5 |
| MAH-PE | | — | — | — | — | — | — | 10 | — |
| MAH-EPR | | — | — | — | 20 | — | — | — | — |
| MAH-EBR | | 10 | 20 | 30 | — | — | 30 | — | 15 |
| MAH-EOR | | — | — | — | — | 20 | — | — | — |
| EPR | | — | — | — | — | — | — | 20 | 15 |
| Adhering force | g/15 mm | | | | | | | | |
| to EtOH layer | | 140 | 200 | 320 | 160 | 180 | 260 | 190 | 230 |
| to PA layer | | 100 | 200 | 280 | 210 | 200 | 240 | 100 | 220 |

4. A multi-layer laminate body having at least three laminated layers which comprises:

(i) a layer of a polyolefin;

(ii) a layer of an adhesive polypropylene resin composition; and (iii) a layer of a polyamide resin and/or an ethylene/vinyl alcohol copolymer;

said layers being laminated in the order of (i), (ii) and (iii), wherein the adhesive polypropylene resin composition of the layer (ii) comprises:

(a) 50 to 90 parts, by weight of the adhesive resin composition, of a modified polypropylene or a composition containing said modified polypropylene, said modified polypropylene being graft-modified with at least one monomer selected from the group consisting of an unsaturated carboxylic acid and an anhydride of a dibasic unsaturated carboxylic acid, and (b) 10 to 50 parts, by weight of the adhesive resin composition, of a graft-modified ethylene/α-olefin copolymer grafted with at least one monomer selected from the group consisting of an unsaturated carboxylic acid and an anhydride of a dibasic unsaturated carboxylic acid;

wherein said graft-modified ethylene/α-olefin copolymer (b) contains 70 to 95 mol % of ethylene as a constituent unit of the copolymer and has:

(i) a density of from 0.860 to 0.930 g/cm³, (ii) a melt flow rate, at 190° C. under a load of 2.16 kg, of from 0.1 to 50 g/10 min., and (iii) a grafting ratio based on a base copolymer of the modified copolymer (b) of from 0.01 to 5% by weight.

5. A multi-layer laminate body according to claim 3, wherein the laminate body is drawn in at least one axial direction.

6. A multi-layer laminate body according to claim 5, wherein the laminate body is drawn in at least one axial direction at a drawing ratio of from 1.5 to 6 times the original dimension.

7. A multi-layer laminate body according to claim 4, wherein the laminate body is biaxially drawn.

8. A multi-layer laminate body according to claim 7, wherein the laminate body is biaxially drawn at a drawing ratio of from 1.5 to 6 times the original dimension.

9. A multi-layer laminate body according to claim 4 wherein the laminate body is a film having a shrinking property.

10. A multi-layer laminate body according to claim 5 wherein the laminate body is a film having a shrinking property.

11. A multi-layer laminate body according to claim 4 wherein the laminate body is a biaxially oriented tubular film.

12. A multi-layer laminate body according to claim 5 wherein the laminate body ms a biaxially oriented tubular film.

13. A multi-layer laminate body according to claim 6 wherein the laminate body ms a biaxially oriented tubular film.

14. A multi-layer laminate body according to claim 7 wherein the laminate body is a biaxially oriented tubular film.

15. A multi-layer laminate body according to claim 8 wherein the laminate body ms a biaxially oriented tubular film.

16. A multi-layer laminate body according to claim 3 wherein the laminate body is a biaxially oriented tubular film.

* * * * *